(12) United States Patent
Pavlov et al.

(10) Patent No.: US 7,737,876 B2
(45) Date of Patent: Jun. 15, 2010

(54) VIDEO-RATE HOLOGRAPHIC SURVEILLANCE SYSTEM

(75) Inventors: Nikolai Pavlov, Jar (NO); Gunnar Maehlum, Oslo (NO)

(73) Assignee: Gama-Medica-Ideas (Norway) As (NO)

( * ) Notice: Subject to any disclaimer, the term of this patent is extended or adjusted under 35 U.S.C. 154(b) by 116 days.

(21) Appl. No.: 11/795,980

(22) PCT Filed: Jan. 25, 2006
(Under 37 CFR 1.47)

(86) PCT No.: PCT/IL2006/000099
§ 371 (c)(1),
(2), (4) Date: Jul. 25, 2007

(87) PCT Pub. No.: WO2006/080006
PCT Pub. Date: Aug. 3, 2006

(65) Prior Publication Data
US 2008/0316088 A1   Dec. 25, 2008

Related U.S. Application Data

(60) Provisional application No. 60/646,642, filed on Jan. 26, 2005.

(51) Int. Cl.
G01S 13/88 (2006.01)
G01S 13/89 (2006.01)
(52) U.S. Cl. ............................ 342/22; 342/27; 342/179; 342/180; 342/197

(58) Field of Classification Search .................... 342/22, 342/27, 179, 180, 197
See application file for complete search history.

(56) References Cited

U.S. PATENT DOCUMENTS

| 4,209,853 | A | * | 6/1980 | Hyatt ........................... 367/8 |
| 4,248,093 | A | * | 2/1981 | Andersson et al. ............ 73/656 |
| 4,717,916 | A | * | 1/1988 | Adams et al. ................ 342/107 |
| 5,384,573 | A | * | 1/1995 | Turpin ......................... 342/179 |
| 5,455,590 | A | * | 10/1995 | Collins et al. ............... 342/179 |
| 5,557,283 | A | * | 9/1996 | Sheen et al. ................. 342/179 |
| 5,734,347 | A |   | 3/1998 | McEligot |

(Continued)

FOREIGN PATENT DOCUMENTS

WO    WO 2006080006 A1 * 8/2006

OTHER PUBLICATIONS

Giubbolini, L., "A Microwave Imaging Radar in the Near Field for Anti-Collision (MIRANDA)", *IEEE Transactions on Microwave Theory and Techniques*, vol. 47, No. 9, pp. 1891-1900, (1999).

*Primary Examiner*—John B Sotomayor
(74) *Attorney, Agent, or Firm*—Christie, Parker & Hale, LLP

(57) ABSTRACT

In a holographic surveillance system (10) for near real-time imaging of a target (15), a source of RF radiation directs a non-amplified reference beam of pulsed coherent RF electromagnetic radiation toward a target. An array of antennas (31) receives a reflected beam from the target together with a component of the reference beam so as to produce a signal representative of phase and amplitude data of received energy, and a processor (20) processes the signals so as to produce a holographic image for display on a display device coupled to the processor.

15 Claims, 2 Drawing Sheets

U.S. PATENT DOCUMENTS

| | | | |
|---|---|---|---|
| 5,751,243 A * | 5/1998 | Turpin | 342/179 |
| 5,859,609 A * | 1/1999 | Sheen et al. | 342/179 |
| 5,974,178 A | 10/1999 | Kitayoshi | |
| 6,590,215 B2 | 7/2003 | Nygard et al. | |
| 7,034,746 B1 * | 4/2006 | McMakin et al. | 342/179 |
| 2002/0175850 A1 * | 11/2002 | Barnes et al. | 342/22 |
| 2004/0246604 A1 * | 12/2004 | Fiete et al. | 359/850 |
| 2008/0316088 A1 * | 12/2008 | Pavlov et al. | 342/179 |

* cited by examiner

VIDEO-RATE HOLOGRAPHIC SURVEILLANCE SYSTEM

CROSS-REFERENCE

This is a National Phase Application filed under 35 U.S.C. 371 of International Application No. PCT/IL2006/000099, filed Jan. 25, 2006, claiming the benefit under 35 USC 119(e) of U.S. Provisional Application No. 60/646,642, filed Jan. 26, 2005, the entire contents of each of which is hereby incorporated by reference in its entirety.

FIELD OF THE INVENTION

The present invention relates to inspection of concealed objects using holography.

BACKGROUND OF THE INVENTION

The need for a new and more versatile personnel inspection system in mass transportation centers has increased in recent years. Traditional inspection systems such as metal detectors and X-ray imaging systems, although capable of near real-time detection, have limitations and adverse effects in the detection of concealed targets. Limitations of metal detectors include the inabilities to (a) provide precise target location, (b) detect plastic concealed weapons, and (c) detect certain metals because of sensitivity variation for various metals. Limitations of X-ray imaging of personnel include radiological health effects. Consequently, holography has been under investigation as an alternative or complementary approach to personnel inspection.

Application of holography to the problem of personnel surveillance has been limited because of the inability to either (a) produce an image of sufficient resolution, or (b) produce an image in real-time, or (c) a combination of both. It is recognized that use of millimeter wave electromagnetic radiation is not a physiological health hazard and such radiation penetrates certain materials, including but not only clothing.

U.S. Pat. No. 5,455,590 (Collins et al.) published Oct. 3, 1995 entitled "Real-time holographic surveillance system" whose contents are incorporated herein by reference discloses a holographic apparatus for near real-time imaging of a target. The apparatus utilizes millimeter wave radiation having a frequency from about 1 to about 110 GHz and comprises:

(a) a holographic array having a plurality of low-gain, end-fire antenna units spaced apart from about 0.25 to about 1.5 wavelength, wherein each unit both sends and receives millimeter wave radiation. The units are connected by a plurality of electronic millimeter wave switches permitting sequential operation of the units, the array spaced apart from the target with a low f-number;

(b) a holographic transceiver system for operating the units and providing each unit with millimeter wave radiation source, then receiving high frequency millimeter wave radiation reflection from the target and collected by the unit, then making an analog oscillated reference signal, together with an analog reflected target signal;

(c) a real-to-imaginary converter for converting the analog oscillated reference signal and the analog reflected target signal to an analog real part of a hologram and an analog imaginary part of the hologram;

(d) an analog to digital converter for converting the analog real part and the analog imaginary part to corresponding digital parts; and (e) a computer for applying a backward wave propagation algorithm that preserves the low f-number to the digital real and digital imaginary parts of the hologram to reconstruct a holographic image.

The apparatus disclosed by U.S. Pat. No. 5,455,590 requires a plurality of low-gain, edge-emitting antenna (known as end-fire) units. Furthermore, operational amplifiers are required to increase the gain of the RF in-phase "I" and quadrature "Q" signals, the gains of the operational amplifiers being set to match the maximum range of the analog to digital (A/D) converters. The antenna is scanned in an X-Y scanner to fill the aperture. Scanning may be mechanical or electrical. Electronic scanning is provided by transmitting and receiving a signal from an individual antenna unit in sequence one at a time in successive order. Electronic millimeter wave switches are used to direct signals to the antenna units.

It would therefore be desirable to provide an improved holographic surveillance system wherein at least some of the above-mentioned drawbacks are reduced or eliminated. Specifically, it would be an advantage to provide holographic surveillance system that permit direct detection with no need for RF amplification or mechanical scanning, thus achieving lower cost and faster imaging rate.

SUMMARY OF THE INVENTION

It is an object of the present invention to provide an improved holographic surveillance system employing electronic scanning and with no need for RF amplification.

It is a particular object of the invention is to perform real-time holographic imaging of persons or objects in order to determine if the person/object carries a concealed object which may be regarded as a threat to safety. The concealed object may among other things be a weapon or an explosive.

Yet a further object of the invention is to provide a holographic surveillance system having:

1. a single mm-wave source;
2. direct detection of the mm.-waves using diodes and integrated electronics, thus obviating the need for RF amplification; and
3. no mechanical scanning, implying possibility of true video rate imaging.

These objects are realized in accordance with a broad aspect of the invention by a holographic surveillance system for near real-time imaging of a target, said system comprising:

a source of RF radiation for directing a non-amplified reference beam of pulsed coherent RF electromagnetic radiation toward a target, an array of antennas for receiving a reflected beam from said target together with a component of the reference beam so as to produce a signal representative of phase and amplitude data of received energy, and a processor for processing said signals so as to produce a holographic image for display on a display device coupled to the processor.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EXEMPLARY EMBODIMENTS

Before describing some specific implementations, the general principle of the invention will first be described. A source of pulsed coherent electromagnetic radiation in the range 30-300 GHz illuminates one or several targets. The reflected electro-magnetic waves together with a component of the illuminating waves (reference beam) are received by an array of antennas, whose antennas are directly coupled to rectifying elements, which may be constituted by Schottky diodes connected to an integrated array of low-noise preamplifiers. The amplified signals are sampled synchronously with the pulsed source by sample-and-hold circuitry integrated together with the preamplifiers. The sampled signals are read out serially into an analog-to-digital converter. The signals are then converted by suitable signal processing into a holographic image that can be displayed on a computer screen. Optionally the holographic image can be overlaid with a conventional visible light video image of the object.

Figure 1:
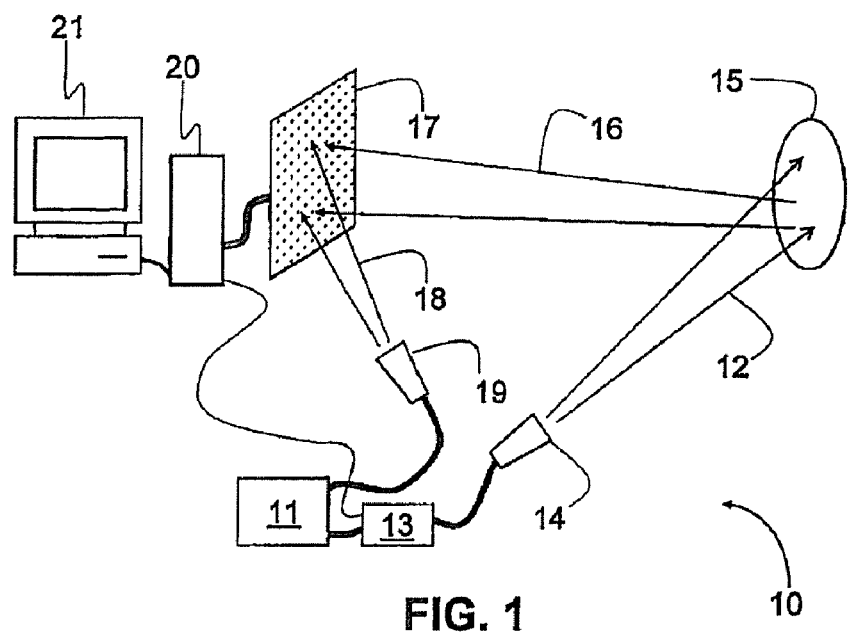
FIG. 1 shows schematically a holographic surveillance system according a first embodiment of the invention.

FIG. 1 shows schematically a holographic surveillance system 10 according to a first embodiment of the invention comprising a microwave generator 11 that emits an incident beam 12 which is modulated by a modulator 13. A transmit antenna 14 coupled to the modulator 13 transmits the modulated incident beam 12 towards a target 15. The incident beam 12 is reflected by the target 15 to form a reflected beam 16, which strikes a receiver array 17. At the same time, a reference beam 18 is emitted by an antenna 19 towards the receiver array 17 so that two signals impinge on the receiver array 17, namely the reflected beam 16 and the reference beam 18. The signals impinging on the receiver array 17 are processed by a processor 20 and displayed on a display device of a computer 21, which also controls the microwave generator 11.

Figure 2:
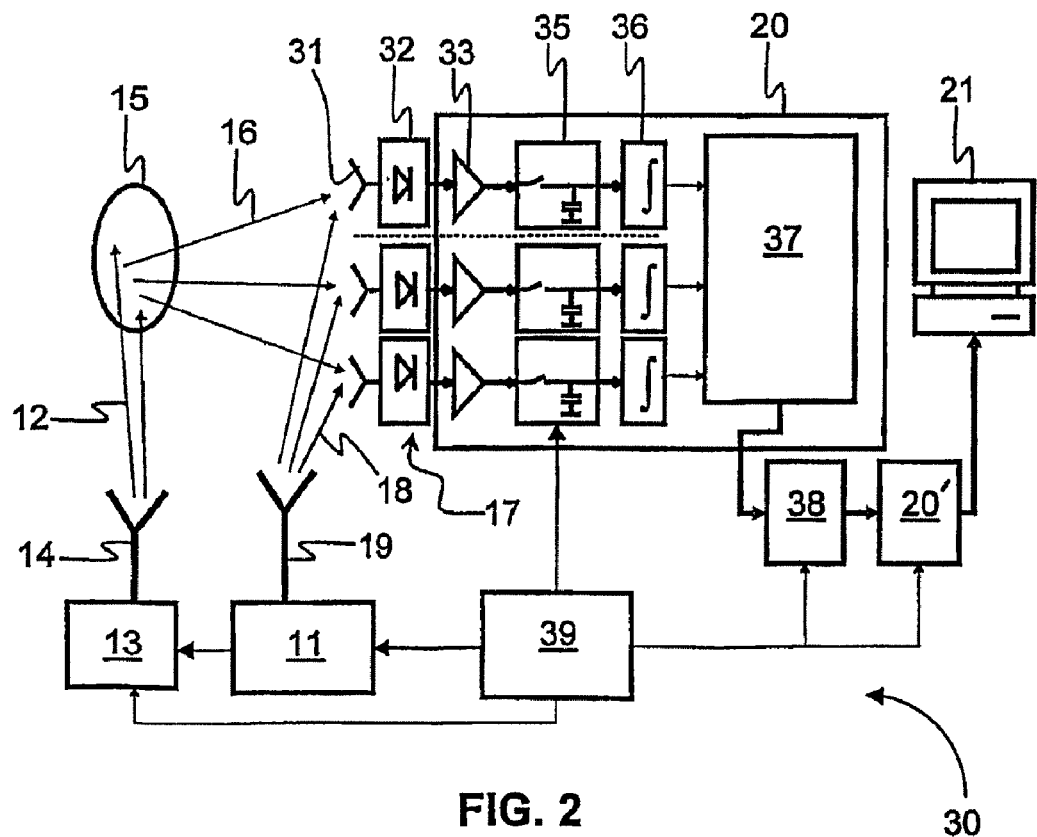
FIG. 2 shows schematically a holographic surveillance system according a second embodiment of the invention.

FIG. 2 shows schematically a holographic surveillance system 30 according to a second embodiment of the invention, wherein components having similar functionality to those shown in FIG. 1 are referenced by identical reference numerals. A microwave generator 11 emits an incident beam 12 which is modulated by a modulator 13 and transmitted by a transmit antenna 14 towards a target 15. The incident beam 12 is reflected by the target 15 to form a reflected beam 16, which is propagated toward an array of receiving antennas 31 each coupled to a respective diode 32 of a diode array which together with the receiving antennas 31 constitutes a receiver array 17. At the same time, a reference beam 18 is emitted by an antenna 19 towards the receiver array 17 so that two signals impinge on the receiver array 17, namely the reflected beam 16 and the reference beam 18. The signals impinging on the receiver array 17 are processed by a processor 20 and displayed by a computer 21, which also controls the microwave generator 11.

The processor 20 comprises an array of low-noise preamplifiers 33, which amplify the received signals. Sample and hold circuits 35 each coupled to the output of a respective preamplifier 33 synchronously sample and store the signals received by the array of diodes 32. Integrators 36 coupled to the sample and hold circuits 35 integrate the stored signal samples over one frame. The integrated signals are frame-by-frame read out serially from an analog shift register 37 and digitized by an analog-to-digital converter 38. The digitized signals are processed by a digital signal processor 20' and displayed by a computer 21, which also controls the microwave generator 11 and the control and a timing unit 39, which feeds timing signals to the microwave generator 11, to the modulator 13 and to the sample and hold circuits 35.

Figure 3:
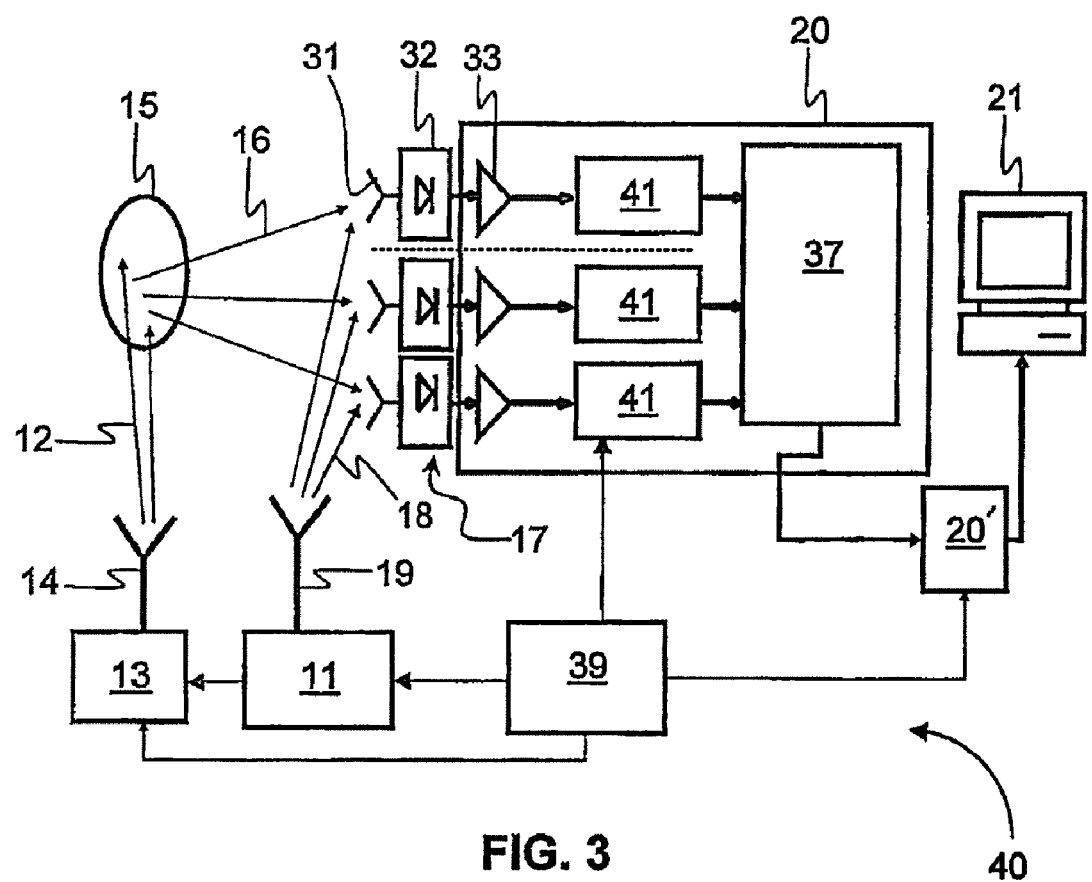
FIG. 3 shows schematically a holographic surveillance system according a third embodiment of the invention.

FIG. 3 shows schematically a holographic surveillance system 40 according to a third embodiment of the invention, wherein components having similar functionality to those shown in FIG. 2 are referenced by identical reference numerals. For the most part, the system 40 is identical to the system 30 except that in FIG. 3, the preamplifiers 33 are connected 1-to-1 to respective ADCs 41 such that the signals are sampled synchronously and converted from analog to digital in parallel for each antenna. The digital signals are then fed to the digital signal processor 20' where they are digitally processed and converted into a holographic image. The timing unit 39 feeds timing signals to the microwave generator 11 and to the modulator 13 as in FIG. 2. Likewise, timing signals are fed to the ADCs 41, there being no need for sample and hold circuits in this configuration.

Having described the broad functionality of some working embodiments, some more detailed description will now be given of the main components, namely:

1. Illuminating source and reference beam;
2. Receiving array;
3. Low noise amplifier array and sample-and-hold circuit;
4. Analog to digital converter, signal processor and display.

1. Illuminating Source

For 60-100 GHz Gunn diodes or IMPATT (avalanche) diodes can be used. Typical power achievable is up to 100 mW average, with IMPATT diodes higher pulsed power in the order of few Watts, can be achievable. The required coherence of 1 MHZ or less bandwidth is easily achievable. The lifetime is high and particularly at reduced power when it is practically unlimited. Schottky diode multipliers starting from lower frequencies, e.g. 30 GHz can be also considered. Also cold cathode pulsed magnetrons, providing up to 4 kW, 20 W average power up to 140 GHz can be used. Use of a magnetron allows for a large increase in the distance to the imaged object owing to the higher power available.

For up to 300 GHz one can multiply frequency of previously mentioned devices with Schottky diodes. However, the power achievable drops dramatically as frequency increases. Only around 1 mw is achievable at 300 GHz.

For up to 1,000 GHz it is possible to use a Backward Wave Oscillator tube (BWO) which is a vacuum tube with hot cathode and a distributed feedback implemented with a waveguide structure. Power level of 3-5 mw is achievable.

The source needs to be equipped with suitable horn antennas for required directivity. The output power is split between the reference beam and the target illuminator, the latter being equipped with amplitude or possibly phase modulator.

A frequency sweep in order of 100 MHz-1 GHz may be required to suppress so-called "speckle pattern".

2. Receiving Array

The purpose of antenna elements is to convert the incoming electromagnetic waves, both from the imaged object and from heterodyne source (reference beam). Since the input impedance of the detector diodes is in the kilo-ohm range, they do not represent a matched load to the antenna. Because of this and the square law diode detection characteristic, it is desirable to provide a maximum output voltage from the antenna element to the diode. That is achieved by using a narrow band resonant antenna element. Also in a narrow angle imaging system, individual antenna elements can be made directional and spaced with a pitch significantly higher than the typical 0.5 times the wavelength used in a wide angle imaging antenna.

Antenna elements may be implemented as low cost PCB based solution if operating below 100 GHz.

Millimeter wave diodes, such as GaAs Schottky diodes or possibly silicon Schottky diodes are used as square law detectors implementing an extremely low excitation power in the order of 1 µW per diode-mixer as a part of an overall heterodyne receiver concept. They may be current biased in order to improve sensitivity and provide more uniformity among channels. Generally, Schottky diodes are proven operational up to 5 THz.

3. Low Noise Amplifier Array and Sample-and-Hold Circuit

The low noise amplifier array and sample-and-hold circuit is implemented as an Application Specific Integrated Circuit, ASIC. As the down conversion is already performed by the diodes this can be implemented as a low-frequency circuit in available CMOS technology. The ASIC is a CMOS mixed signal device containing up to 256 channels of low noise amplifiers, sample and hold circuitry and analog multiplexer. The ASICs can also provide the detector diode bias current (20 µA or so). The ASIC is able to amplify diode signals whose noise is 10 nV/√Hz or less. Current noise from the ASIC is insignificant.

The readout system consisting of the ASICs and data acquisition system samples holds and digitizes all channels within a period of 1 ms-50 ms. The shortest sampling time is governed by the need to avoid holographic related artifacts when observing moving objects. The largest time corresponds to the maximum given by the requirement of video rate imaging. The power consumption is in order of 0.1 to 1 mW per channel, making overall power consumption less than 100 W. The imaging system comprises any number of channels limited only by size and economy. A typical system comprises 100,000 channels.

The data acquisition system is implemented as a distributed modular readout system based on high speed serial data links (LVDS) and generally is similar to known systems such as described in U.S. Pat. No. 6,590,215 (Nygard et al.) entitled "Readout circuit for a charge detector" assigned to Ideas ASA of Høvik, Norway and Toshiba Corporation of Tokyo, Japan and whose contents are incorporated herein by reference.

4. Analog to Digital Converter, Signal Processor and Display

The analog-to-digital converter converts the serial data stream from the low-noise amplifier array. The ADC is sufficiently fast and segmented to safeguard a complete readout of the array within one frame as required by the video-rate imaging.

The holographic reconstruction is done in one or several digital signal processors that are implemented either as commercial DSPs or in programmable gate arrays (FPGAs). The signal processing requirements are very large but recent advances in the art have shown that on-line holographic reconstruction is possible with existing gate-arrays. The manner in which the digitized signals are processed by the digital signal processor 20' to produces the holographic image is not itself a feature of the invention. The antennas receive a reflected beam from the target together with a component of the reference beam so as to produce a signal representative of phase and amplitude data of received energy. The phase and amplitude data is used to produce a holographic image as described, for example, in above-referenced U.S. Pat. No. 5,455,590, whose contents are incorporated herein by reference.

Holographic imaging principles utilized is similar to optical (Gabor) holography. The intensity recorded by imaging matrix is a product of coherent interference between reference beam and illuminating beam scattered by the object. Because of the diode's initial quadratic characteristic when the applied voltage is near zero, whereby the voltage-current characteristic of the diode shows square behavior at around zero applied voltage, detected signal current will be proportional to square of amplitude of detected wave. This is similar to optical local film exposure in optics which is also proportional to square of amplitude of detected wave.

As in optical holography, we can represent reference beam as a superposition of flat waves:

$$A = \sum_i A_i e^{-j\vec{k}_i \vec{x}}$$

The same applies to radiation scattered by the object:

$$B = \sum_l B_l e^{-j\vec{k}_l \vec{x}}$$

The intensity detected in the plane of receiving array (in optical case—local film exposure) is given by:

$$\|AB\| = \sum_i \overline{A}_i e^{-j\vec{k}_i \vec{x}} \sum_l B_l e^{-j\vec{k}_l \vec{x}}$$

$$= \sum_i \sum_l \left( \begin{array}{c} \overline{A}_i B_l e^{-j(\vec{k}_i - \vec{k}_l)\vec{x}} + \\ A_i \overline{B}_l e^{+j(\vec{k}_i - \vec{k}_l)\vec{x}} \end{array} \right) + \sum_i \|A_i\|^2 + \sum_i \|B_i\|^2$$

In optical holography illuminating of detected intensity (exposure pattern) with reference beam again reproduces the wave field of the object:

$$\|AB\| * A = \|AB\| * \sum_m A_m e^{-j\vec{k}_m \vec{x}} = \sum_m A_m$$

$$e^{-j\vec{k}_m \vec{x}} \left( \sum_i \sum_l \left( \begin{array}{c} \overline{A}_i B_l e^{-j(\vec{k}_i - \vec{k}_l)\vec{x}} + \\ A_i \overline{B} e^{+j(\vec{k}_i - \vec{k}_l)\vec{x}} \end{array} \right) + \sum_i \|A_i\|^2 + \sum_i \|B_i\|^2 \right)$$

$$\|AB\| * A = \sum_m A_m e^{-j\vec{k}_m \vec{x}} \sum_i \sum_l (\overline{A}_i B_l + A_i \overline{B}_l) e^{-j(\vec{k}_i - \vec{k}_l)\vec{x}} +$$

$$\left( \sum_i \|A_i\|^2 + \sum_i \|B_i\|^2 \right) \sum_m A_m e^{-j\vec{k}_m \vec{x}}$$

$$\|AB\| * A = \sum_m \sum_i A_m \overline{A}_i e^{-j(\vec{k}_m - \vec{k}_i)\vec{x}} \sum_l B_l e^{-j\vec{k}_l \vec{x}} +$$

-continued $$\left(\sum_i \|A_i\|^2 + \sum_i \|B_i\|^2\right) \sum_m A_m e^{-j\vec{k}_m \vec{x}} +$$

$$\sum_m \sum_i A_m \overline{A}_i e^{-j(\vec{k}_m + \vec{k}_i)\vec{x}} \sum_l \overline{B}_l e^{j\vec{k}_l \vec{x}}$$

The last equation consists of three terms. The first term corresponds to reconstructed scattered wave-front of the object (limited to hologram/antenna recorded interference pattern area) and the second term to reference beam passing through. The third term corresponds to the aliasing image known in optical holography.

The hologram/antenna recorded interference pattern area must be sufficiently large that kx>>1 and it can be assumed that interference patterns between individual flat waves interference will be averaged to zero. This is also true if the reference beam is represented by one flat wave. So we have:

$$\sum_m \sum_i A_m \overline{A}_i e^{-j(\vec{k}_m - \vec{k}_i)\vec{x}} = \sum_m \|A_m\|^2 + \sum_{m \neq i} A_m \overline{A}_i e^{-j(\vec{k}_m - \vec{k}_i)\vec{x}}$$

$$\approx \sum_m \|A_m\|^2$$

As a consequence we have:

$$\|AB\| * A \approx$$

$$\sum_m \|A_m\|^2 \sum_l B_l e^{-j\vec{k}_l \vec{x}} + \left(\sum_i \|A_i\|^2 + \sum_i \|B_i\|^2\right) \sum_m A_m e^{-j\vec{k}_m \vec{x}} +$$

$$\sum_m \sum_i A_m \overline{A}_i e^{-j(\vec{k}_m + \vec{k}_i)\vec{x}} \sum_l \overline{B}_l e^{j\vec{k}_l \vec{x}}.$$

Here one again can clearly identify three terms: the first one corresponds to the reconstructed scattered waterfront of the object and the second to the reference beam passing through, the third one refers to the aliasing image.

If the reference beam is represented by one flat wave A, one can simplify previous equation:

$$\|AB\| * A \approx$$

$$\|A\|^2 \sum_l B_l e^{-j\vec{k}_l \vec{x}} + \left(\|A\|^2 + \sum_i \|B_i\|^2\right) A e^{-j\vec{k}\vec{x}} + A^2 \sum_l \overline{B}_l e^{+j(\vec{k}_l - 2\vec{k})\vec{x}}$$

In mm-wave holography, optical reconstruction is replaced by numerical reconstruction performed by a digital signal processor (DSP). Since interference pattern is sampled in space (x) domain, reconstruction of the interference pattern in k domain (=flat wave imaging or setting focus/imaging plane to infinity) as well as reconstruction in different space plane (=focus on different distance) is essentially achieved by a Fourier transform.

Modifications apart from those described will be apparent to those skilled in the art without departing from the scope of the invention as claimed. For example, while the integrators integrate the stored signal samples over one frame, signals may be integrated over more than one frame and the integrated signals over more than one frame may be read out serially from an analog shift register and digitized by an analog-to-digital converter. Thus, the essential feature of the invention resides in that no RF amplification is required. The subsequent signal acquisition and processing may be done in various ways, which will be apparent to those skilled in the art and the description, while providing several exemplary enabling approaches, is not intended to be binding.

The invention claimed is:

1. A holographic surveillance system for near real-time imaging of a target, said system comprising:
    a source of RF radiation for directing a non-amplified reference beam of pulsed coherent RF electromagnetic radiation toward a target,
    an array of antennas for receiving a reflected beam from said target together with a component of the reference beam so as to produce signals representative of phase and amplitude data of received energy, and
    a processor for processing said signals so as to produce a holographic image for display on a display device coupled to the processor.

2. The holographic surveillance system according to claim 1, wherein the display device is adapted to display a conventional visible light video image of the object overlaid on the holographic image.

3. The holographic surveillance system according to claim 1, wherein the RF electromagnetic-radiation is in the range 30-300 GHz.

4. The holographic surveillance system according to claim 1, wherein the processor comprises an integrated array of low-noise preamplifiers coupled to the array of antennas for amplifying said signals.

5. The holographic surveillance system according to claim 4, further comprising:
    an analog-to-digital converter coupled to the preamplifiers for producing digital signals representative of the phase and amplitude data of the received energy for processing by a digital signal processor.

6. A holographic surveillance system for near real-time imaging of a target, said system comprising:
    a source of RF radiation for directing a non-amplified reference beam of pulsed coherent RF electromagnetic radiation toward a target,
    an array of antennas for receiving a reflected beam from said target together with a component of the reference beam so as to produce signals representative of phase and amplitude data of received energy,
    respective rectifying elements coupled to each of the antennas for allowing said signals representative of the phase and amplitude data of the received energy to pass through while preventing the received energy from returning to the target, and
    a processor for processing said signals so as to produce a holographic image for display on a display device coupled to the processor, wherein the processor comprises:
    an integrated array of low-noise preamplifiers each coupled to a respective rectifying element of the rectifying elements and for amplifying said signals,
    respective sample-and-hold circuits coupled to each of the preamplifiers for sampling received signals, and
    an analog-to-digital converter coupled to the sample-and-hold circuits for producing digital signals representative of the phase and amplitude data of the received energy for processing by a digital signal processor.

7. The holographic surveillance system according to claim 6, including:
respective integrators coupled to each of the sample and hold circuits for integrating stored signal samples over a single frame; and
an analog shift register coupled to the integrators for serially reading out the integrated signals frame-by-frame and passing said integrated signals to the analog-to-digital converter.

8. The holographic surveillance system according to claim 6, including:
respective integrators coupled to each of the sample and hold circuits for integrating stored signal samples over multiple frames; and
an analog shift register coupled to the integrators for serially reading out the signals integrated over said multiple frames and passing said integrated signals to the analog-to-digital converter.

9. The holographic surveillance system according to claim 6, wherein the rectifying elements are Schottky diodes.

10. The holographic surveillance system according to claim 6, wherein the rectifying elements are integrated together with the preamplifiers.

11. A holographic surveillance system for near real-time imaging of a target, said system comprising:
a source of RF radiation for directing a non-amplified reference beam of pulsed coherent RF electromagnetic radiation toward a target,
an array of antennas for receiving a reflected beam from said target together with a component of the reference beam so as to produce signals representative of phase and amplitude data of received energy,
a processor for processing said signals so as to produce a holographic image for display on a display device coupled to the processor, wherein the processor comprises:
respective integrators coupled to each of the antennas for integrating stored signal samples over a single frame; and
an analog shift register coupled to the integrators for serially reading out the integrated signals frame-by-frame and passing said integrated signals to an analog-to-digital converter.

12. A holographic surveillance system for near real-time imaging of a target, said system comprising:
a source of RF radiation for directing a non-amplified reference beam of pulsed coherent RF electromagnetic radiation toward a target,
an array of antennas for receiving a reflected beam from said target together with a component of the reference beam so as to produce signals representative of phase and amplitude data of received energy,
a processor for processing said signals so as to produce a holographic image for display on a display device coupled to the processor, wherein the processor comprises:
respective integrators coupled to each of the antennas for integrating stored signal samples over multiple frames; and
an analog shift register coupled to the integrators for serially reading out the signals integrated over said multiple frames and passing said integrated signals to an analog-to-digital converter.

13. A holographic surveillance system for near real-time imaging of a target, said system comprising:
a source of RF radiation for directing a non-amplified reference beam of pulsed coherent RF electromagnetic radiation toward a target,
an array of antennas for receiving a reflected beam from said target together with a component of the reference beam so as to produce signals representative of phase and amplitude data of received energy,
respective rectifying elements coupled to each of the antennas for allowing said signal representative of the phase and amplitude data of the received energy to pass through while preventing the received energy from returning to the target, and
a processor for processing said signals so as to produce a holographic image for display on a display device coupled to the processor, wherein the processor comprises:
an integrated array of low-noise preamplifiers each coupled to a respective rectifying element of the rectifying elements for amplifying said signals, and
respective analog-to-digital converters coupled to the preamplifiers for producing digital signals representative of the phase and amplitude data of the received energy for processing by a digital signal processor.

14. The holographic surveillance system according to claim 13, wherein the rectifying elements are Schottky diodes.

15. The holographic surveillance system according to claim 13, wherein the rectifying elements are integrated together with the preamplifiers.

* * * * *